United States Patent
Krieg

(10) Patent No.: US 7,610,292 B2
(45) Date of Patent: Oct. 27, 2009

(54) SYSTEMS AND METHODS FOR STORING A DATASET HAVING A HIERARCHICAL DATA STRUCTURE IN A DATABASE

(75) Inventor: Jan Krieg, Vienna, VA (US)

(73) Assignee: SAP AG, Walldorf (DE)

( * ) Notice: Subject to any disclaimer, the term of this patent is extended or adjusted under 35 U.S.C. 154(b) by 527 days.

(21) Appl. No.: 11/504,054

(22) Filed: Aug. 15, 2006

(65) Prior Publication Data

US 2007/0043693 A1   Feb. 22, 2007

(30) Foreign Application Priority Data

Aug. 18, 2005   (EP) .................................. 05107593

(51) Int. Cl.
*G06F 7/00* (2006.01)
*G06F 17/00* (2006.01)

(52) U.S. Cl. .................... 707/100; 707/101; 707/104.1; 707/200; 707/204

(58) Field of Classification Search ........................ None
See application file for complete search history.

(56) References Cited

U.S. PATENT DOCUMENTS

| | | | | |
|---|---|---|---|---|
| 5,778,393 | A * | 7/1998 | Blea et al. .................... | 707/205 |
| 6,154,747 | A * | 11/2000 | Hunt ........................... | 707/100 |
| 6,684,222 | B1 | 1/2004 | Cornelius et al. | |
| 6,738,779 | B1 * | 5/2004 | Shapira ....................... | 707/101 |
| 7,178,150 | B1 * | 2/2007 | Ahmad et al. ................ | 719/313 |
| 2003/0041304 | A1 | 2/2003 | Numata et al. | |
| 2004/0044678 | A1 | 3/2004 | Kalia et al. | |
| 2004/0163041 | A1 | 8/2004 | Engel | |
| 2004/0215626 | A1 * | 10/2004 | Colossi et al. ............... | 707/100 |
| 2005/0038804 | A1 * | 2/2005 | Shimizu ....................... | 707/100 |
| 2005/0055343 | A1 | 3/2005 | Krishnamurthy | |
| 2005/0097504 | A1 | 5/2005 | Ballinger et al. | |
| 2006/0004750 | A1 * | 1/2006 | Huang et al. .................... | 707/6 |

OTHER PUBLICATIONS

R. Bourret, et al., "A Generic Load/Extract Utility for Data Transfer Between XML Documents and Relational Databases", Proceedings of International Workshop on Advance Issues of E-Commerce and Web-Based Information Systems, 2000, pp. 134-143.

(Continued)

*Primary Examiner*—Tim T. Vo
*Assistant Examiner*—Jay A Morrison
(74) *Attorney, Agent, or Firm*—Finnegan, Henderson, Farabow, Garrett & Dunner LLP

(57) ABSTRACT

Systems and methods are provided for storing a dataset having a hierarchical data structure in a database. In one implementation, a data processing system includes a data dictionary for storing data that describes predefined hierarchical data structures, wherein each data structure includes a plurality of data fields that have a unique field name and at least one field attribute. The data processing system also includes a volatile storage that stores a dataset having a unique dataset name. The dataset is an instance of one of the predetermined hierarchical data structures. A serializer is provided that converts the dataset into a data string. An access key is generated for the data string. Moreover, the data processing system includes a non-volatile storage that stores a database table and database export means for storing the string in the database table using the access key that is assigned to the dataset name.

19 Claims, 8 Drawing Sheets

OTHER PUBLICATIONS

F. Simeoni, et al., "An Approach To High-Level Language Bindings To XML", Information And Software Technology, vol. 44 (2002), pp. 217-228.

Search Report from the European Patent Office in European Application No. EP 05 10 7593, Dated Jan. 9, 2006 (6 pages).

* cited by examiner

SYSTEMS AND METHODS FOR STORING A DATASET HAVING A HIERARCHICAL DATA STRUCTURE IN A DATABASE

I. TECHNICAL FIELD

The present invention generally relates to the field of data processing. More particularly, and without limitation, the invention relates to systems and methods for storing a dataset having a hierarchical data structure in a database.

II. BACKGROUND INFORMATION

Typically, data is persistently stored in database tables. However, application programs often require datasets that have a more complex or a less complex hierarchical structure. For example, certain application programs may be unable to handle data of a particular format or may not be able to efficiently store a large volume of data. Accordingly, efficient storage of such hierarchical datasets in a database is needed.

SUMMARY

In one embodiment of the present invention, a data processing system may include data dictionary means for storing data descriptive of predefined hierarchical data structures. Each data structure may include a plurality of data fields that have a unique field name and at least one field attribute. The system may also include volatile storage means for storing a dataset. The dataset may be an instance of one of the data structures and may have a unique dataset name. Further, the system may include serializer means for converting the dataset into a data string, means for generating an access key for the data string, non-volatile storage means for storing a database table, database export means for storing the string in the database table using the access key, and means for storing an assignment of the access key to the dataset name.

Embodiments of the present invention may facilitate storage of a dataset that has a hierarchical data structure in a database table. This may be accomplished by serializing the hierarchical dataset into a data string. The data string may be stored in a database table using an access key for later retrieval of the string and reconstruction of the dataset.

In accordance with an embodiment of the present invention, a globally unique identifier (GUID) is generated for the string and used as the access key for storing the string in the database table.

In accordance with another embodiment of the present invention, the string is split into one or more sub-strings if the string surpasses a predefined maximum length. For example, a counter value may indicate the number of the sub-strings is stored in the database table in addition to the access key.

In another embodiment of the present invention, a method stores a dataset having a hierarchical data structure in a database. The method may comprise converting the dataset into a data string, generating an access key for the data string, storing the string in a database table using the access key, and storing a unique name of the dataset and the assigned access key in a lookup table.

In yet another embodiment of the present invention, a data processing system may include data dictionary means for storing data descriptive of predefined hierarchical data structures. Each data structure may include a plurality of data field that have a unique field name and at least one field attribute. Each data field may have an arbitrary data type such as field, structure, table etc. The system may further include a database table for storing a string such that the string is accessible based on an access key, and means for storing an assignment of the access key to a unique name of a dataset. The dataset may be an instance of one of the data structures. Further, the system may include database import means for reading the string from the database table using the access key, deserializer means for converting the string into the dataset, and volatile storage means for storing the dataset.

Embodiments of the present invention may facilitate reading a hierarchical dataset from a database table. An access key for reading the dataset from the database table may be obtained from a lookup table. Based on the access key, a string or a number of sub-strings may be read from the database table. If the database table contains a number of sub-strings, the sub-strings may be concatenated in order to recover the original string. The string may be deserialized to provide the requested dataset.

In accordance with another embodiment of the present invention, the data dictionary means including descriptions of the data structures used in the data processing system may be editable. For example, the predefined data structures may be modifiable. After storage of a dataset, the dataset's data structure may be changed by adding or deleting fields and/or by modifying one of more field attributes. For example, the deserializer means may identify identical field names in the string and in the up to date data structure. If the field names have matching field attributes, the data value assigned to the field name and data string may be assigned to the respective field in the dataset. If the field attributes do not match, an error message may be generated. For example, a mismatch of the field attributes may occur if the length of the field has been shortened and would lead to a loss of data. A mismatch may also occur if the data type of a data field has been changed such as from table to a simple integer field. If the field name contained in the string does no longer occur in the data structure, the data assigned to that field is ignored as its respective field has been deleted from the data structure and is therefore not of relevancy anymore.

In one embodiment, if the data processing system allows to dynamically modify or add data structures during the runtime, the respective structural definition data may also be stored for use by the deserializer. Preferably, the dynamic changes to the predefined hierarchical data structures and/or the addition of new hierarchical data structures may be persistently stored in addition to the data dictionary.

Embodiments of the present invention may be used for the processing of "mass activities." A mass activity is a standardized data processing task that involves the processing of a large number of datasets, such as for the generation of invoices, payment reminders, salary statements, etc. Furthermore, implementations of the serializer/deserializer and export/import functionalities of the present invention may be implemented in a mass activity tool for efficient data storage and data access. For example, the mass activity tool may include a parallelization component for splitting a given mass activity into multiple parallel processes in order to provide short latency times for accessing the datasets.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION OF THE EMBODIMENTS

Figure 1:
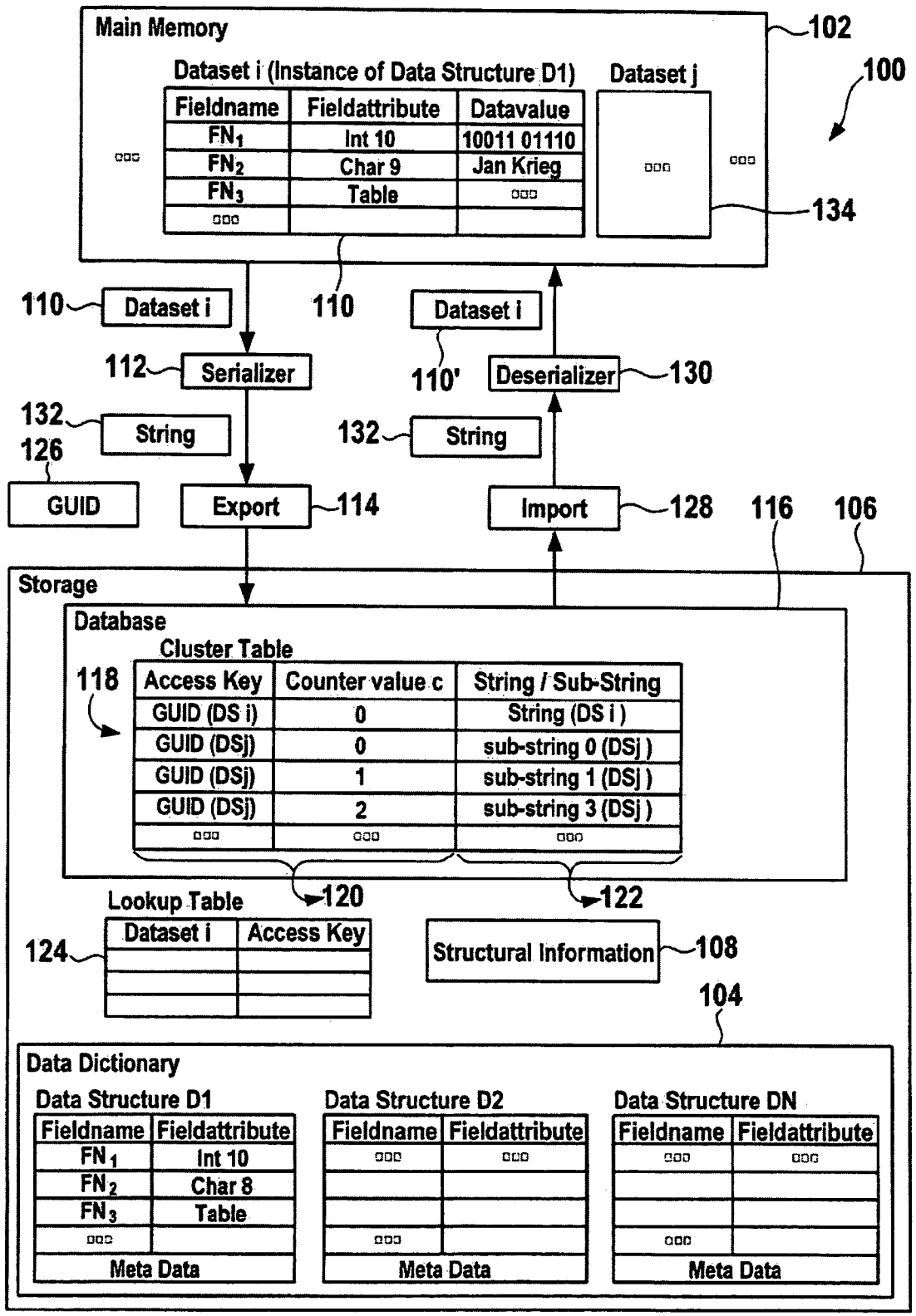
FIG. 1 is a block diagram of an exemplary data processing system, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 is a block diagram of an exemplary data processing system 100, consistent with an embodiment of the present invention. Data processing system 100 includes a main memory 102 for temporarily storing datasets 110, 134, . . . , such as dataset i, dataset j, . . . For example, the dataset i is an instance of a data structure D1 whereas the dataset j can be an instance of the same or another data structure. The data structures that are available in data processing system 100 may be defined by data dictionary 104, which is persistently stored in a storage 106. Storage 106 may be a non-volatile memory, such as a magnetic disc. Furthermore, hierarchical data structures are defined in data dictionary 104 by means of their field names and respective field attributes. A field attribute can indicate that the respective data field is of data type "structure" or "table" or another data type. For example, data structure D1 has a field name $FN_1$; its respective data field has a field attribute 'Int 10' by which the type of the data field (i.e., integer length 10) is defined. Similarly, data structure D1 may include a definition of a data field that has field name $FN_2$ and field attribute "Char 9," which means that the data field is of type "character," length 8. Furthermore, data structure D1 may include a field having field name $FN_3$ with the field attribute "table," which means that this field has a tabular structure. In addition, data structure D1 may contain metadata that describe the hierarchical relationships between the defined data fields.

The data dictionary 104 may contain a large number of such definitions of data structures D1, D2, . . . , Dn, . . . , DN. The definitions of the data structures contained in the data dictionary 104 may be modified. For example, data fields of a given data structure can be deleted or added. Further, field attributes of a given data field can also be modified by, for example, by changing the length of the respective data field. These modifications may be performed during the built time of the data processing system 100.

For example, the data processing system 100 may allow modifications of the data structure definitions during runtime. Data that is descriptive of such changes during run-time may be stored in a table included in storage area 108 during run-time in order to supplement data dictionary 104. Furthermore, the table that stores this structural information may be held in main memory 102 during run-time. After program execution, the table may be persistently stored in the storage area 108 for later reference.

Data structures that are defined by data dictionary 104 and storage area 108 may also be referred to as "data types." Data structures (or data types) that are modified and/or added during run-time may also be referred to as "dynamic data types." A dataset i, which is stored in main memory 102, is an instance of data structure D1. Data structure D1 holds various data values, such as a data value of 1001101110 in integer 10 format for the data field $FN_1$, the data value "Jan Krieg" of data type character, and length 9 for data field $FN_2$, etc.

Data processing system 100 may include a serializer 112 for converting a dataset that has a hierarchical data structure into a flat data string. Conversion of a hierarchical dataset into a data string by serialization is often referred to as "marshaling." An inverted transformation for converting the string back to the hierarchical dataset is referred to as "deserialization" or "unmarshaling." Serialization and deserialization techniques are disclosed in, for example, U.S. Patent Publication No. 2004/0044678 A1 and U.S. Patent Publication No. 2005/0097504 A1.

Serializer 112 may convert a hierarchical dataset into a string (i.e., a serial format) such as into a mark-up language format. For example, serializer 112 converts the dataset into an extensible mark-up language (XML) format. Data processing system 100 may include a database export component 114 that is coupled to serializer 112. Database export component 114 exports the string generated by the serializer 112 into a database 116 that is persistently stored in storage 106. The terms "export" and "import" are used here from the perspective of an application program that reads and writes to and from the database 116. Further, database 116 has a database table 118 that is called a "cluster table." Database table 118 may include a transparent table portion 120 for storage of access keys and counter values in un-encoded transparent form. Further, database table 118 may include a raw data portion 122 for storing of strings and/or sub-strings. For example, strings and/or sub-strings are stored in raw data portion 122 in a binary code format, such as in UNICODE.

A lookup table 124 is stored in storage 106 for assigning access keys to datasets. The lookup table 124 is used for obtaining the access key that is required from reading the string and/or the sub-strings obtained from a dataset for recovery of the dataset from database table 118. For example, a globally unique identifier (GUID) is used as an access key.

Data processing system 100 may include a GUID generator 126 for generating GUID access keys.

Database import component 128 may import data from the database 116 for recovery of a required dataset. Database import component 128 may read the access key of a required dataset from lookup table 124 in order to access a respective entry in database table 118. If the respective entry consists of a number of sub-strings in raw data portion 122, then database import component 128 concatenates the sub-strings to provide the original string. The string is then deserialized by deserializer 130 to provide the dataset 110'. Usually, dataset 110' is identical to the original dataset 110. However, dataset 110' may deviate from the original dataset 110 if the respective data structure definition has been modified between storage of original dataset 110 in database table 110 and the read operation for obtaining dataset 110'.

In order to store dataset 110, serializer 112 converts hierarchical dataset 110 into a serial format to provide a string 132. A GUID is generated for string 132 by GUID generator 126. If the length of the string 132 is below a predefined threshold value, then the string is not split up into sub-strings, but is instead stored in raw data portion 122 of database table 118.

The GUID that was generated for string 132 is stored in transparent portion 120 of database table 118 for later access to the string. Further, a counter value c=0 can be stored in transparent portion 120 of database table 118. The counter value may be a running number of sub-strings that have been created for a string, if any. In the example considered herein, there is only a single entry into the cluster table for dataset 110 as this dataset does not surpass the predefined threshold value. A single entry that is created for dataset 110 in the cluster table may indicate that the respective string has not been split up into sub-strings. Thus, entry of dataset 110 into database table 118 includes the GUID that has been assigned to dataset 110, the counter value c=0, and the string that has been provided by serializer 112.

The string that is generated by serializer 112 for dataset 134 has a length that exceeds a predefined maximum length. For example, the maximum length is 500 Bytes. However, another convenient choice of the maximum length is also possible. As the string that is generated by serializer 112 for dataset 134 surpasses the predefined maximum length, the string is split into sub-strings where each sub-string does not surpass the predefined maximum length.

In the example considered herein, the string that is generated by serializer 112 for dataset 134 is split by database export component 114 into d=3 sub-strings (sub-string 0, sub-string 1 and sub-string 3). This is reflected by respective counter values ranging from c=0 to c=2, wherein d denotes the number of sub-strings, if any, into which a string is split. Thus, the three entries in database table 118 for the string that is created for dataset 134 each include the GUID assigned to the string, one of the sub-strings into which the string has been split, and a counter value c that indicates the running number of the respective sub-string. Other datasets that are held in the main memory 102 can be persistently stored in the database table 118 in an analogous way.

To read a previously stored dataset from the database 116, the procedure is as follows. Database import component 128 reads the access key assigned to the requested dataset from lookup table 124 using the dataset's name. Database import component 128 uses the access key obtained from lookup table 124 to read a respective entry or entries from database table 118 that match the access key. If there is more than one entry for the same access key, there is a respective number of sub-strings that need to be read by database import component 128. Database import component 128 concatenates the sub-strings in order to recover the original string such as string 132 if dataset 110 is required.

Deserializer 130 reads the data structure of the required dataset, such as data structure D1 in the case of dataset 110, from data dictionary 104. Deserializer 130 creates a new instance of data structure D1 for generating dataset 110'. The instance of data structure D1 (i.e., dataset 110'), may have the same data structure as original dataset 110 so long as data structure D1 had not been modified in the meanwhile. If modifications were performed, they are described in storage area 108.

Deserializer 130 identifies identical field names in string 132 and in dataset 110'. If the field attributes of the identical field names are also identical, deserializer 130 assigns the data value of the field in string 132 to the respective field having the identical field name in dataset 110'. If the field attributes are not the same, deserializer 130 makes a determination whether storing the original data value in the modified field would lead to a loss of data due to the changed field attribute. If the latter is the case, deserialization is aborted with an error message. Otherwise, deserialization continues. As a result, dataset 110' is generated and stored in main memory 102 for further processing.

Figure 2:
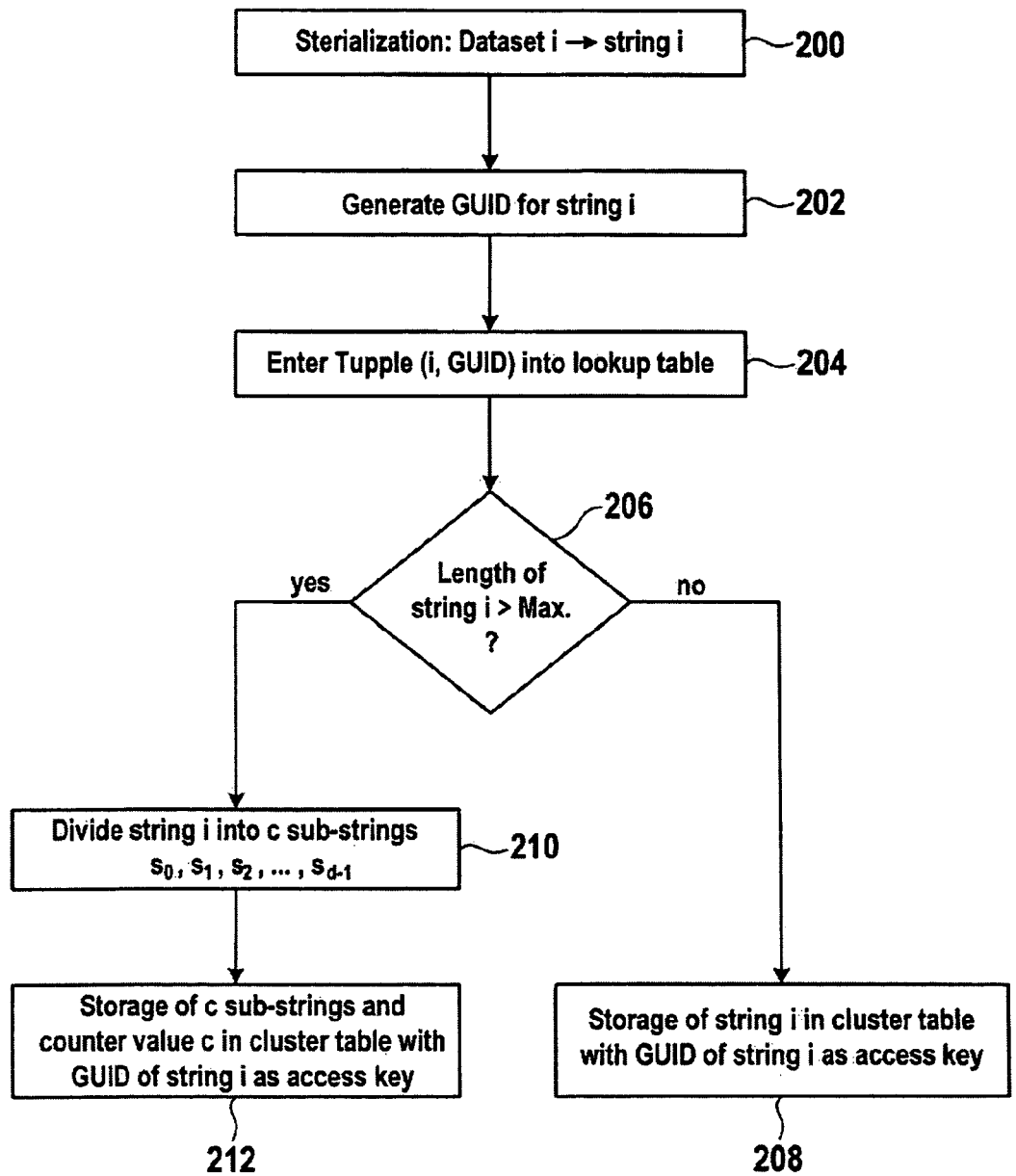
FIG. 2 is a flowchart illustrating an exemplary method for storing a dataset in a database table, consistent with an embodiment of the present invention.

FIG. 2 shows a flowchart illustrating am exemplary method for storing a dataset that has a hierarchical data structure in a database, consistent with an embodiment of the present invention. In step 200, dataset i is serialized in order to provide a respective string i that has a non-hierarchical, flat data structure. For example, the string has a mark-up language format.

In step 202, an access key, such as a GUID, is generated for the string i. In step 204, a tupple consisting of the dataset's name 'i' and its assigned access key (i.e., its GUID), is entered into a lookup table for later reference. In step 206, a determination is made whether the string i exceeds a predefined maximum length. If this is not the case, the storage operation is completed in step 208 by storing the string i in a cluster table of the database using the assigned GUID as an access key. The access key is stored in a transparent portion of the cluster table whereas the string i is stored in a raw data format.

If a determination is made in step 206 that the string i does in fact exceed the predefined maximum length, control goes to step 210. In step 210, string i is split up into a number of d sub-strings. For example, the sub-strings $s_0, s_1, s_2, \ldots s_{d-2}$ all have the predefined maximum length whereas the last sub-string $s_{d-1}$ has a length that is given by the residual of the splitting operation. Next, in step 212, the storage operation is completed by storing a number of d entries in the cluster table that each consist of the access key, i.e. the GUID assigned in step 202, the respective counter value ranging from c=0 to c=d−1, and the sub-strings created in step 210.

Figure 3:
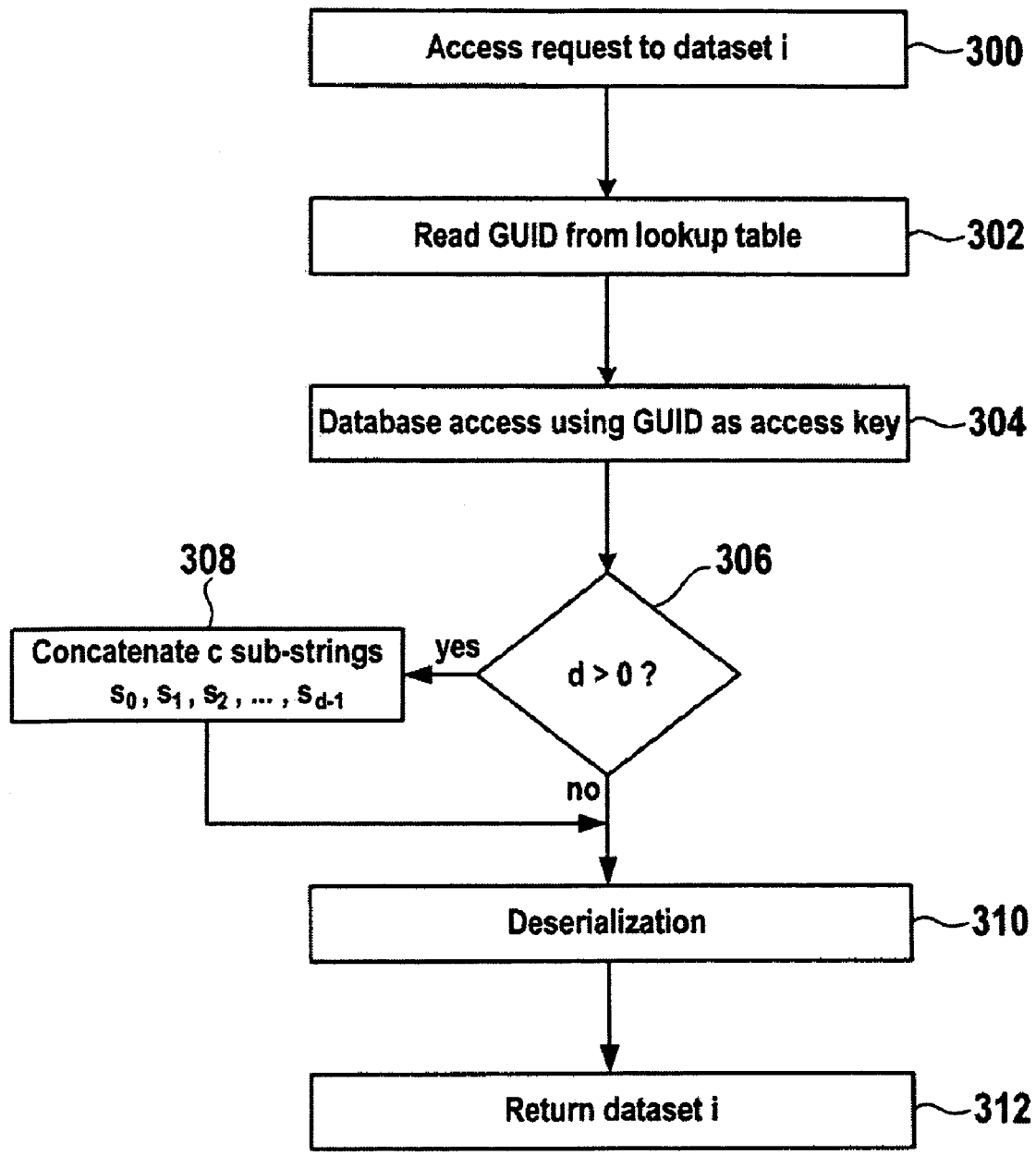
FIG. 3 is a flowchart illustrating an exemplary method for reading a dataset from a database table, consistent with an embodiment of the present invention.

FIG. 3 shows a flowchart that illustrates an exemplary access operation for a previously stored dataset that has a hierarchical data structure, consistent with an embodiment of the present invention. In step 300, an access request is received from a user or an application program. The access request is directed towards the dataset i. In step 302, the access key for the dataset i is read from the lookup table. In step 304, the database access is performed using the GUID read from the lookup table as an access key. By means of the GUID the database table entry or entries that have been created for the dataset i can be read. If a number d of entries match the GUID (step 306) this indicates a respective number d of sub-strings that are concatenated in step 308 for recovery of the original string. In step 310, the string is deserialized in order to provide the requested dataset i that is returned to the requestor in step 312.

Figure 4:
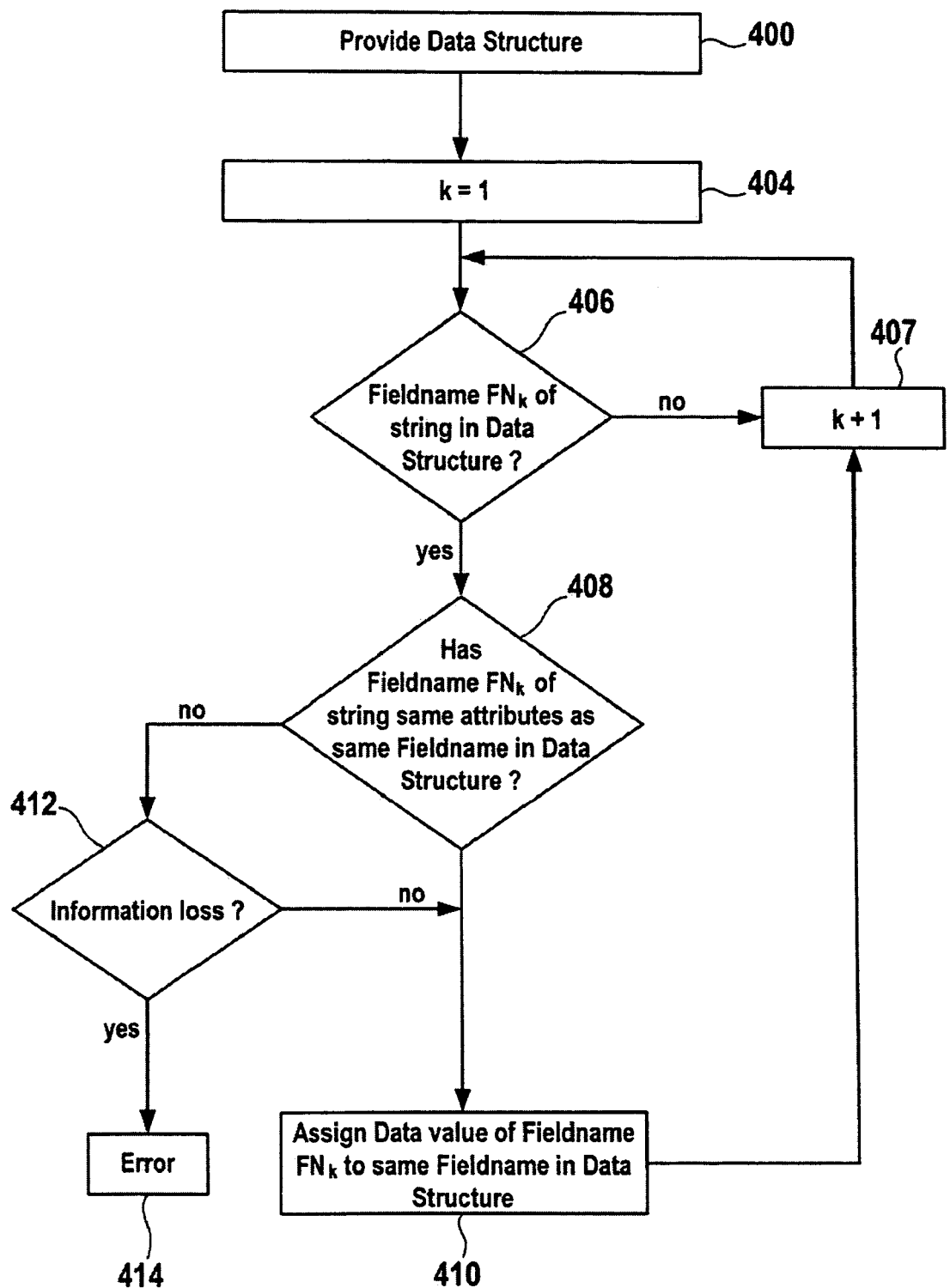
FIG. 4 is a flowchart illustrating an exemplary method for deserialization of the string when the data structure definition contained in a data dictionary has been changed after storage of the dataset, consistent with an embodiment of the present invention.

FIG. 4 shows a flowchart illustrating an exemplary embodiment of the deserialization process performed in step 310 and or in step 312 of FIG. 3, consistent with an embodiment of the present invention.

In step 400, a data structure Dn is provided to the deserializer. This can be done by an application program the has requested to read the dataset i (DSi) from the data dictionary. The data structure Dn is instantiated in order to create a new dataset DS'i. The new dataset DS'i may or may not have the same data structure as the original datasets DSi depending on whether the data structure Dn has been modified between the storage of the dataset DSi in the database and the read operation for recovery of the dataset.

In step 404, the field name index k of the field names contained in the string is initialized. In step 406, a determination is made whether the field name $FN_k$ of the string does also occur in the data structure Dn. If this is not the case, the respective data field has been deleted and the data assigned to the respective data field in the string is not of relevancy anymore. In this case, control goes to step 407 in order to increment k. From there, control returns to step 406.

If a given field name $Fn_k$ of the string does occur in the data structure Dn, then control goes to step 408. In step 408, a determination is made whether that field name of the string has the same attributes as the identical field name in the data structure Dn. If this is the case, the data value assigned to the field $Fn_k$ is assigned to the data field of the dataset DS'i that has the identical field name in step 410. From there the control goes to step 407 in order to increment the index k.

If a determination is made in step 408 that the field attributes have been modified, control goes to step 412. In step 412, a determination is made whether the assignment of the data value of the data field $Fn_k$ contained in the string to the data field having the identical field name but other field attributes in the dataset DS'i would lead to a loss of information. For example, a loss of information would occur when the length of the data field has been shortened (e.g., from Int 10 to Int 8). If no such information loss would occur (e.g., if the length of the data field has not been shortened but increased), control goes to step 410. Otherwise, deserialization is aborted in step 414 with an error message. Further, steps 400 to 414 can be performed again when the resultant DS'i needs to be written to still another data structure Dn+1 when the result is returned in step 312.

Figure 5:
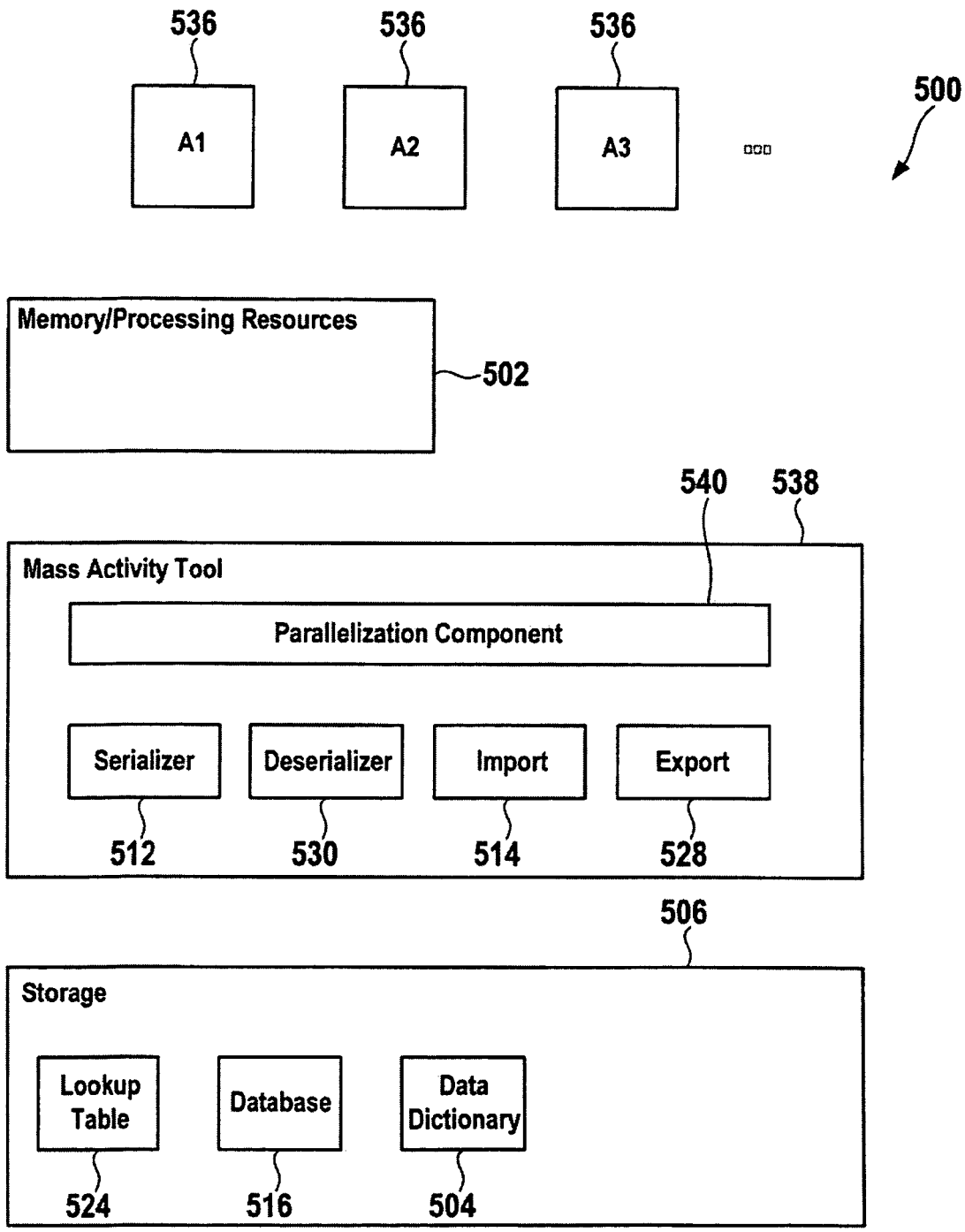
FIG. 5 is a block diagram of an exemplary data processing system having a mass activity tool, consistent with an embodiment of the present invention.

FIG. 5 shows an exemplary data processing system 500, consistent with an embodiment of the present invention. Elements in the embodiment of FIG. 5 that correspond to elements in the embodiment of FIG. 1 are designated by like reference numerals. Data processing system 500 has a number of application programs 536 A1, A2, A3, . . . for performing various mass activities. Further, data processing system 500 has memory and processing resources 502 that can be provided by a single computer system or by a network of interconnected computer systems.

Data processing system 500 may include a mass activity tool 538 that facilitates the performance of mass activities by application programs 536. Mass activity tool 538 includes a parallelization component 540 for parallelization of a mass activity using multiple computer systems provided by resources 502. Mass activity tool 538 further includes a serializer 512, deserializer 530, a database export component 515, and a database import component 528. Serializer 512, deserializer 530, database export component 514 and database import component 528 may store a hierarchically structured dataset in database 516 and may read the dataset from database 516, respectively, as described above with respect to FIGS. 1 to 4. Further, database 516 is persistently stored in storage 506 as well as lookup table 524 and data dictionary 504.

In one embodiment, parallelized mass activities use serializer 512 and database export component 514 for persistently storing datasets in database 516. Further, parallelized mass activities use deserializer 530 and database import component 528 for efficient read access for recovery of previously stored datasets.

Figure 6:
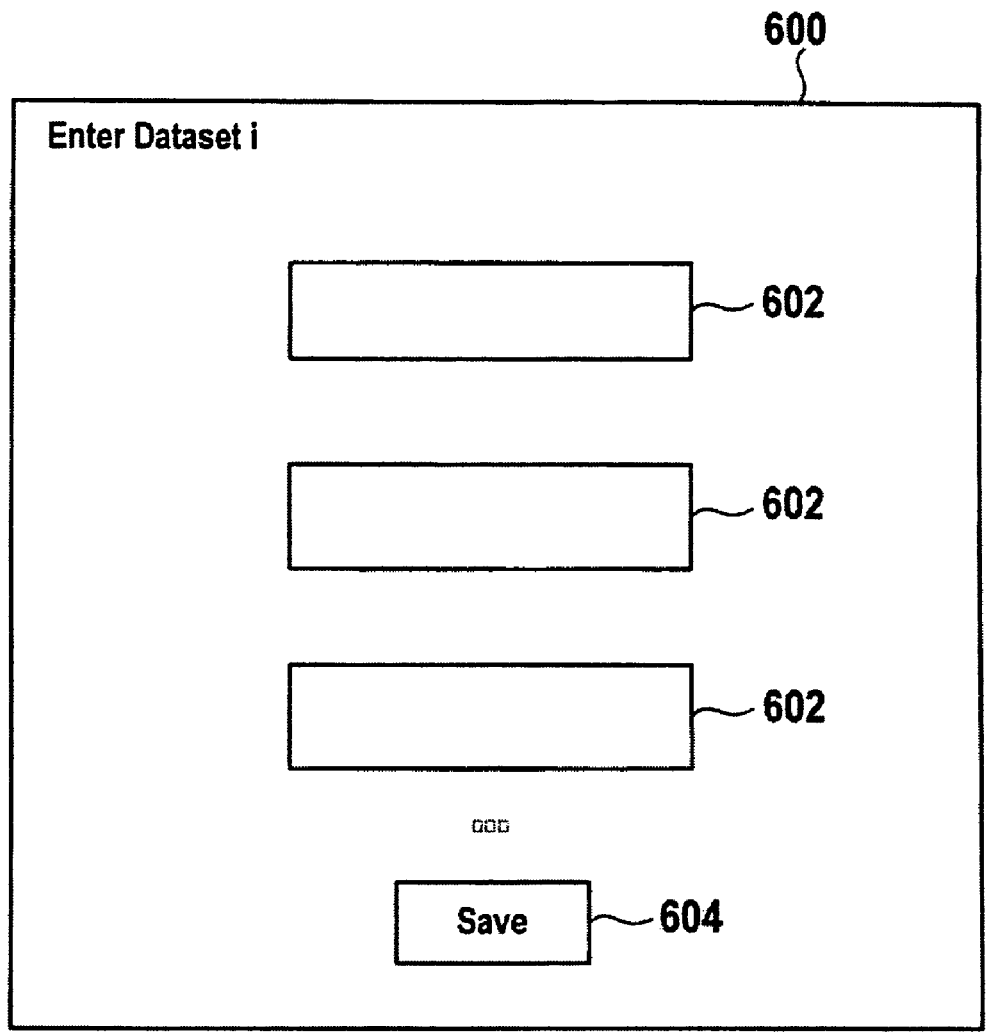
FIG. 6 is an exemplary schematic of a data entry window for a user's entry of a dataset, consistent with an embodiment of the present invention.

FIG. 6 shows an exemplary window 600 of a graphical user interface of data processing system z for entry of the dataset i, consistent with an embodiment of the present invention. Window 600 has data entry fields 602 for entry of data values for the data fields $Fn_k$ contained in the dataset i. After entry of the data values, a user can click on a save button 604 for storage of the dataset i in the database. Depending on the implementation, this initiates storage of the dataset i in the cluster table of the database.

Figure 7:
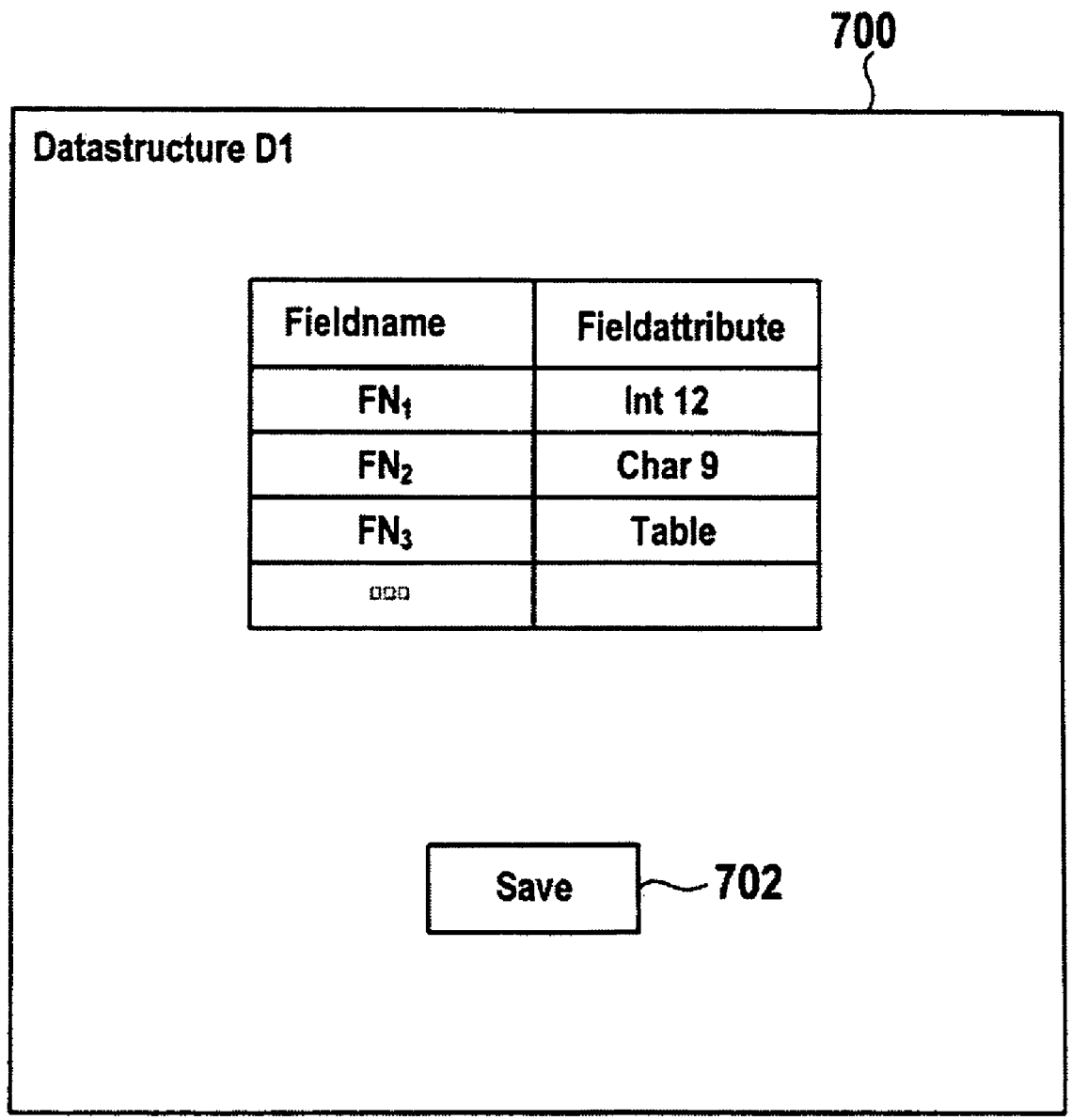
FIG. 7 is an exemplary window for viewing the data structure definition and modifying the data structure definition of a data dictionary, consistent with an embodiment of the present invention.

FIG. 7 shows an exemplary window 700 that is used by an administrator for modification of a data dictionary, consistent with an embodiment of the present invention. In the example considered herein, data structure D1 is displayed in window 700. A user can edit changes by adding data fields, deleting data fields, and/or modifying field attributes. For example, a field attribute of data field $Fn_1$ is changed from integer 10 to integer 12. This modification is persistently stored in the data dictionary when the administrator clicks on save button 702.

Figure 8:
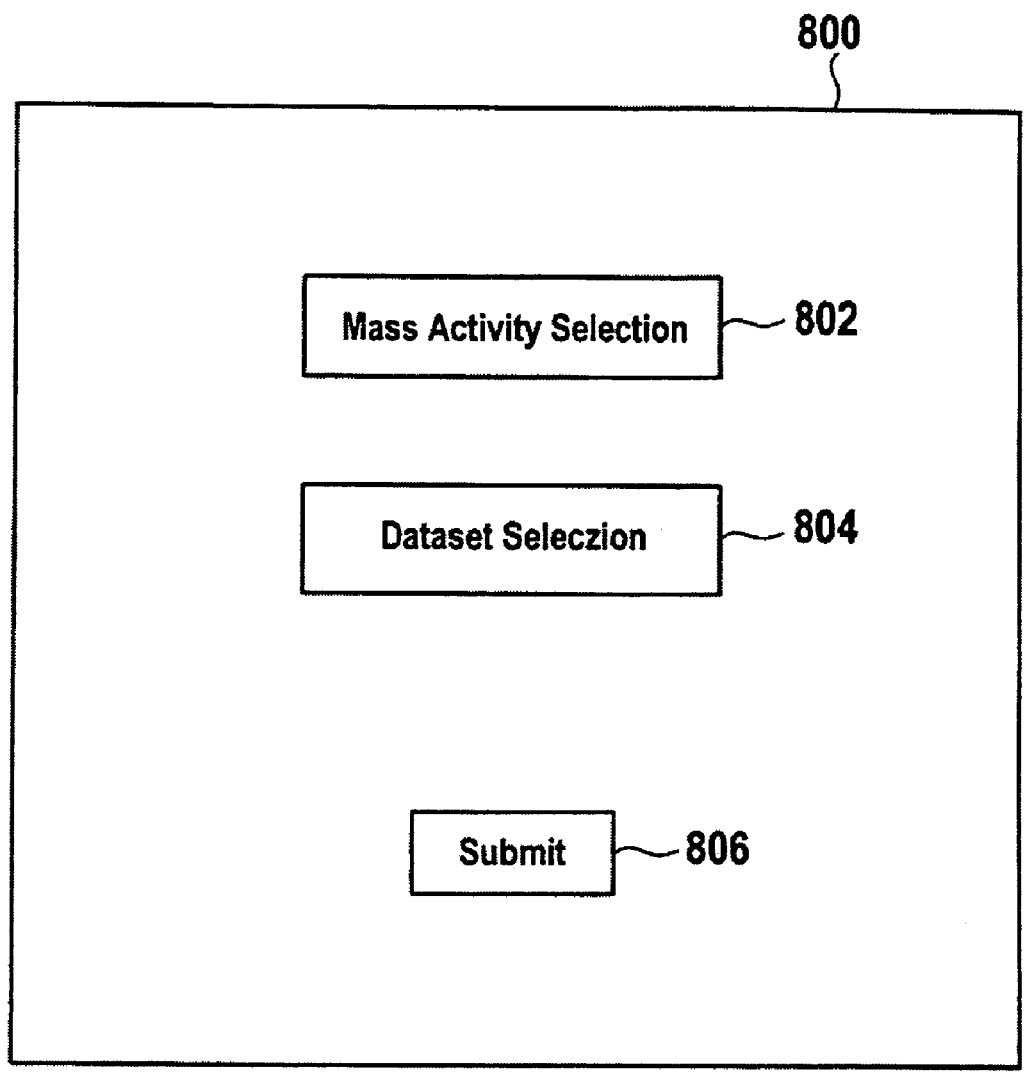
FIG. 8 is an exemplary window of a user interface for selecting a mass activity and the datasets for which the selected mass activity is to be performed, consistent with an embodiment of the present invention.

FIG. 8 shows an exemplary window 800 of data processing system 500 of FIG. 5, consistent with an embodiment of the present invention. Window 800 has a menu 802 for selection of a mass activity. Further, window 800 has a menu 804 for a user's selection of datasets that are to be processed by means of the selected mass activity. Clicking on submit button 806 starts the specified mass activity.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A data processing system, comprising:
   a volatile storage for storing a dataset having a unique dataset name, wherein the dataset is an instance of one of a plurality of predetermined hierarchical data structures;
   a serializer for converting the dataset into a data string, the serializer dividing the data string into a plurality of sub-strings when a length of the data string is greater than a predefined maximum length;
   means for generating an access key for the data string;
   means for generating counter values corresponding to the plurality of sub-strings, the counter values identifying a number of divisions of the data string;
   a non-volatile storage for storing a database table;
   database export means for storing the plurality of sub-strings in the database table using the access key, wherein each sub-string is assigned the access key generated for the data string and a corresponding counter value;
   means for storing an assignment of the access key to the unique dataset name for enabling retrieval of the plurality of sub-strings from the database table;
   a data dictionary for storing description data that describes the plurality of predetermined hierarchical data structures, the hierarchical data structure corresponding to the dataset having a field name and field attribute described by the description data;
   means for looking up the access key by using the unique data set name;
   means for retrieving the plurality of sub-strings and corresponding counter values by using the access key looked up based on the unique data set name;
   means for concatenating the plurality of sub-strings into the data string by using the counter values;
   a deserializer for converting the concatenated data string into the dataset; and
   means for verifying accuracy of the conversion by comparing a field name and a field attribute included in the converted data set with the description data describing the field name and field attribute in the data dictionary.

2. The data processing system of claim 1, wherein the access key is a globally unique identifier.

3. The data processing system of claim 1, wherein the stored description data in the data dictionary can be edited in order to modify one of the plurality of hierarchical data structures.

4. The data processing system of claim 1, further comprising:
   a mass activity tool; and
   a number of application programs that perform mass activities using the database table.

5. The data processing system of claim 1, wherein the means for retrieving includes database import means for reading the plurality of sub-strings from the database table using the access key.

6. The data processing system of claim 1, wherein the data string or the plurality of sub-strings are stored in a binary format in the database table.

7. The data processing system of claim 5, wherein the database import means includes the means for concatenating.

8. The data processing system of claim 5, wherein the data structure of the dataset comprises a data field that has a unique name and the deserializer identifies identical field names contained in the data string and in the data structure of the dataset in order to assign data values contained in the data string to the data field of the data set.

9. The data processing system of claim 5, wherein the deserializer compares field attributes of identical field names corresponding to the hierarchical data structures and generates a message if the field attributes do not match.

10. The data processing system of claim 9, further comprising means for changing the description data stored in the data dictionary after the serializer converts the dataset into the data string, wherein the means for verifying returns an error message after comparing the field name and the field attribute included in the converted dataset with the description data describing the field name and field attribute in the data dictionary due to the change in the description data.

11. A method of processing a dataset having a hierarchical data structure in a database, the method being executed by a data processing system and comprising:
   storing a dataset having a unique dataset name, wherein the dataset is an instance of one of a plurality of predetermined hierarchical data structures;
   converting the dataset into a data string by using a serializer;
   dividing the data string into a plurality of sub-strings when a length of the data string is greater than a predefined maximum length;
   generating an access key for the data string;
   generating counter values corresponding to the plurality of sub-strings, the counter values identifying a number of divisions of the data string;
   storing the data string in a database table using the access key;
   storing the plurality of sub-strings in the database table using the access key, wherein each sub-string is assigned the access key generated for the data string and a corresponding counter value;
   storing a unique name of the dataset and the access key in a lookup table for enabling retrieval of the plurality of sub-strings from the database table;
   storing a data dictionary including description data that describes the plurality of predetermined hierarchical data structures, the hierarchical data structure corresponding to the dataset having a field name and a field attribute described by the description data;
   looking up the access key by using the unique data set name;
   retrieving the plurality of sub-strings and corresponding counter values by using the access key looked up based on the unique data set name;

concatenating the plurality of sub-strings into the data string by using the counter values;

converting the concatenated data string into the dataset by using a deserializer; and verifying accuracy of the conversion by comparing a field name and a field attribute included in the converted dataset with the description data describing the field name and field attribute in the data dictionary.

12. The method of claim 11, wherein the data string or the plurality of sub-strings are stored in a binary format in the database table.

13. The method of claim 11, further comprising:

identifying identical field names contained in the data string and in the data structure of the dataset in order to assign data values contained in the data string to data fields of the data set.

14. The method of claim 11 further comprising:

reading the access key from a lookup table using the unique name; and reading the plurality of sub-strings from the database table using the read access key.

15. The method of claim 11, further comprising changing the description data stored in the data dictionary after the serializer converts the dataset into the data string, wherein the comparison returns an error message after comparing the field name and the field attribute included in the converted dataset with the description data describing the field name and field attribute in the data dictionary due to the change in the description data.

16. A computer-readable storage device comprising computer executable instructions being executed on a data processor to perform a data processing method for processing a dataset having a hierarchical data structure in a database, the method comprising:

storing a dataset having a unique dataset name, wherein the dataset is an instance of one of a plurality of predetermined hierarchical data structures;

converting the dataset into a data string;

dividing the data string into a plurality of sub-strings when a length of the data string is greater than a predefined maximum length;

generating an access key for the data string;

generating counter values corresponding to the plurality of sub-strings, the counter values identifying a number of divisions of the data string;

storing the data string in a database table using the access key;

storing the plurality of sub-strings in the database table using the access key, wherein each sub-string is assigned the access key generated for the data string and a corresponding counter value;

storing a unique name of the dataset and the access key in a lookup table for enabling retrieval of the plurality of sub-strings from the database table;

storing a data dictionary including description data that describes the plurality of predetermined hierarchical data structures, the hierarchical data structure corresponding to the dataset having a field name and a field attribute described by the description data;

looking up the access key by using the unique data set name;

retrieving the plurality of sub-strings and corresponding counter values by using the access key looked up based on the unique data set name;

concatenating the plurality of sub-strings into the data string by using the counter values;

converting the concatenated data string into the dataset; and verifying accuracy of the conversion by comparing a field name and a field attribute included in the converted with the description data describing the field name and field attribute in the data dictionary.

17. The computer readable storage medium of claim 16, further comprising:

reading the access key from a lookup table using the unique name; and reading the plurality of sub-strings from the database table using the read access key.

18. The computer readable storage medium of claim 16, further comprising changing the description data stored in the data dictionary after the dataset is converted into the data string, wherein the comparison returns an error message after comparing the field name and the field attribute included in the converted dataset with the description data describing the field name and field attribute in the data dictionary due to the change in the description data.

19. The computer readable storage medium of claim 16, wherein the data string or the plurality of sub-strings are stored in a binary format in the database table.

* * * * *

UNITED STATES PATENT AND TRADEMARK OFFICE
CERTIFICATE OF CORRECTION

PATENT NO. : 7,610,292 B2 Page 1 of 1
APPLICATION NO. : 11/504054
DATED : October 27, 2009
INVENTOR(S) : Jan Krieg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Twelfth Day of October, 2010

David J. Kappos
*Director of the United States Patent and Trademark Office*